(12) United States Patent
Yan

(10) Patent No.: US 10,561,221 B2
(45) Date of Patent: Feb. 18, 2020

(54) DEVICE FOR PACKAGING AND DISPENSING A PRODUCT, NOTABLY A COSMETIC PRODUCT

(71) Applicant: GALDERMA RESEARCH & DEVELOPMENT, Biot (FR)

(72) Inventor: Jian Yan, Kirkland (CA)

(73) Assignee: GALDERMA RESEARCH & DEVELOPMENT, Biot (FR)

( * ) Notice: Subject to any disclaimer, the term of this patent is extended or adjusted under 35 U.S.C. 154(b) by 0 days.

(21) Appl. No.: 16/312,224

(22) PCT Filed: Jul. 4, 2017

(86) PCT No.: PCT/EP2017/066595
§ 371 (c)(1),
(2) Date: Dec. 20, 2018

(87) PCT Pub. No.: WO2018/007366
PCT Pub. Date: Jan. 11, 2018

(65) Prior Publication Data
US 2019/0231053 A1    Aug. 1, 2019

(30) Foreign Application Priority Data
Jul. 6, 2016    (FR) ..................................... 16 56461

(51) Int. Cl.
*B05B 11/00*    (2006.01)
*A45D 40/00*    (2006.01)
*B05B 1/16*    (2006.01)

(52) U.S. Cl.
CPC ............ *A45D 40/00* (2013.01); *B05B 1/1663* (2013.01); *B05B 11/00416* (2018.08);
(Continued)

(58) Field of Classification Search
CPC ........... B05B 11/00416; B05B 11/3023; B05B 11/3069; B05B 11/3088; B05B 1/1663;
(Continued)

(56) References Cited

U.S. PATENT DOCUMENTS 2,067,601 A * 1/1937 Dobkin .................... A47K 5/14
                                                          222/190
2,736,266 A * 2/1956 Rodth .................... F02M 37/20
                                                           96/214
(Continued)

FOREIGN PATENT DOCUMENTS

EP       2995571 A1    3/2016
WO    WO 89/11445 A1    11/1989

OTHER PUBLICATIONS

International Search Report issued in PCT/EP2017/066595, dated Aug. 16, 2017.
(Continued)

*Primary Examiner* — Charles Cheyney
(74) *Attorney, Agent, or Firm* — Sunit Talapatra; Foley & Lardner LLP

(57) ABSTRACT

The device for packaging and dispensing a product comprises a container provided with at least one variable volume compartment, and a dispensing head fastened to the container. The dispensing head comprises a mounting base, an internal piston that is movable in translation along a displacement axis Y-Y' and delimits, inside said base, first and second pumping chambers, and at least one actuating rod that extends through the pumping chambers and the piston and projects from either side of the mounting base. The actuating rod internally delimits a first feed duct in communication with a first outlet orifice of the dispensing head and a second feed duct separate from said first duct and in communication with a second outlet orifice of said head.

16 Claims, 7 Drawing Sheets

Figure 1:
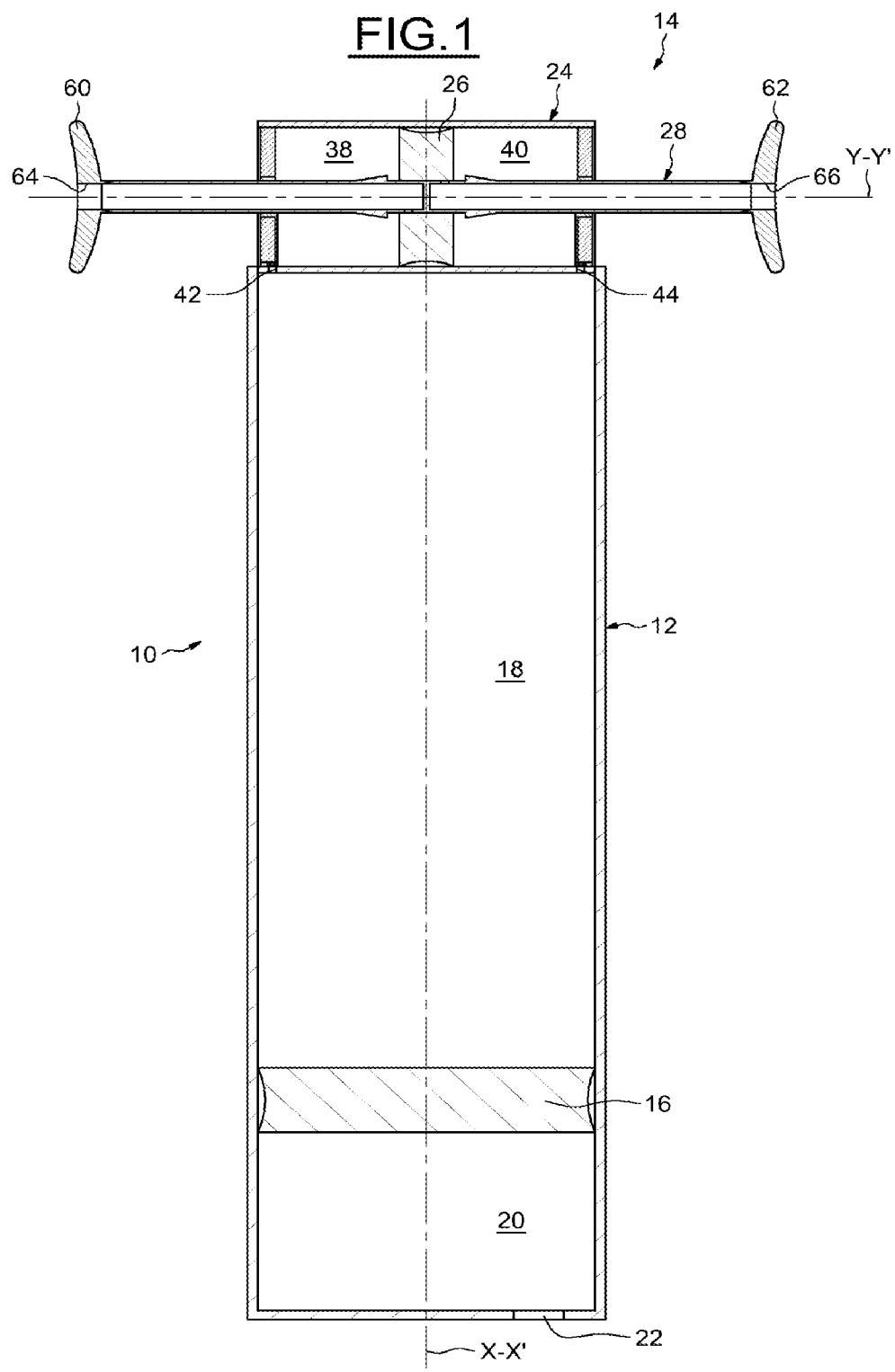

(52) U.S. Cl.
CPC ...... *B05B 11/3023* (2013.01); *B05B 11/3069* (2013.01); *B05B 11/3088* (2013.01); *A45D 2200/055* (2013.01); *A45D 2200/056* (2013.01)

(58) Field of Classification Search
CPC ...... B67D 1/101; B67D 1/1288; B67D 1/107; G01F 11/04; G01F 11/021; B01F 15/0466; A45D 40/00; A45D 2200/055; A45D 2200/056
USPC ....... 222/249, 253, 339, 386–393, 409, 340, 222/321.4
See application file for complete search history.

(56) References Cited

U.S. PATENT DOCUMENTS

| | | | | |
|---|---|---|---|---|
| 2,995,241 | A * | 8/1961 | Klotz | 209/554 |
| 3,552,606 | A * | 1/1971 | Kraft | G01F 11/04 222/249 |
| 4,120,619 | A * | 10/1978 | Blackband | B05B 11/3023 417/511 |
| 4,779,761 | A * | 10/1988 | Rudick | B67D 1/0027 222/1 |
| 5,361,944 | A * | 11/1994 | Hauf | B05B 11/3015 222/136 |
| 5,482,187 | A * | 1/1996 | Poulsen | B05B 11/0054 222/207 |
| 5,931,347 | A * | 8/1999 | Haubrich | B05B 11/0037 222/129 |
| 6,082,593 | A * | 7/2000 | Borcherds | A47K 5/1207 222/181.3 |
| 6,231,322 | B1 * | 5/2001 | Adolfsson | B67D 1/004 261/35 |
| 9,890,771 | B2 * | 2/2018 | Jiang | F04B 53/10 |
| 2002/0100772 | A1 * | 8/2002 | Bonningue | B05B 11/3001 222/321.2 |
| 2010/0051650 | A1 * | 3/2010 | Chou | B05B 11/3088 222/383.1 |
| 2012/0267398 | A1 | 10/2012 | Lim | |

OTHER PUBLICATIONS

Written Opinion of the International Searching Authority issued in PCT/EP2017/066595, dated Aug. 16, 2017.

* cited by examiner

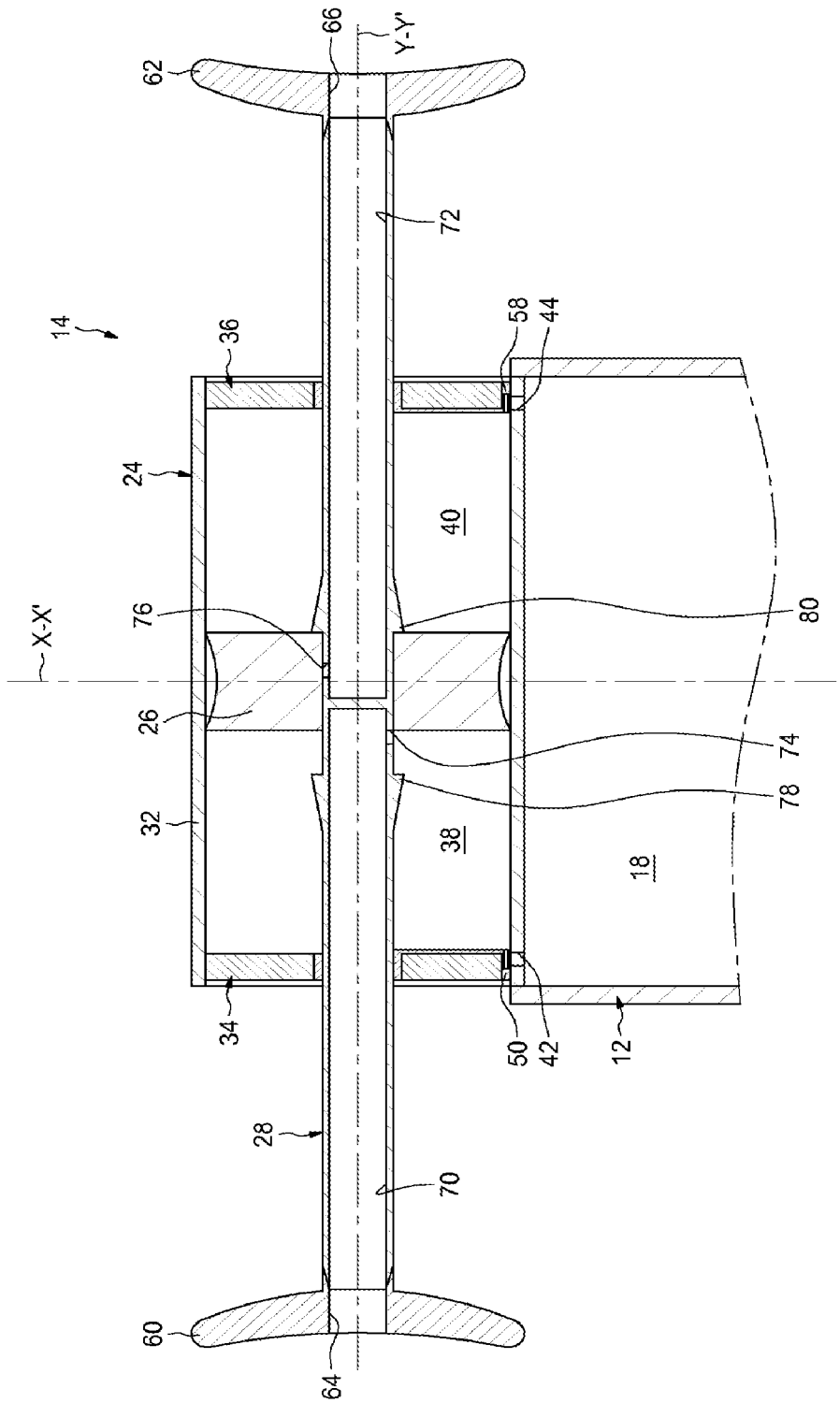

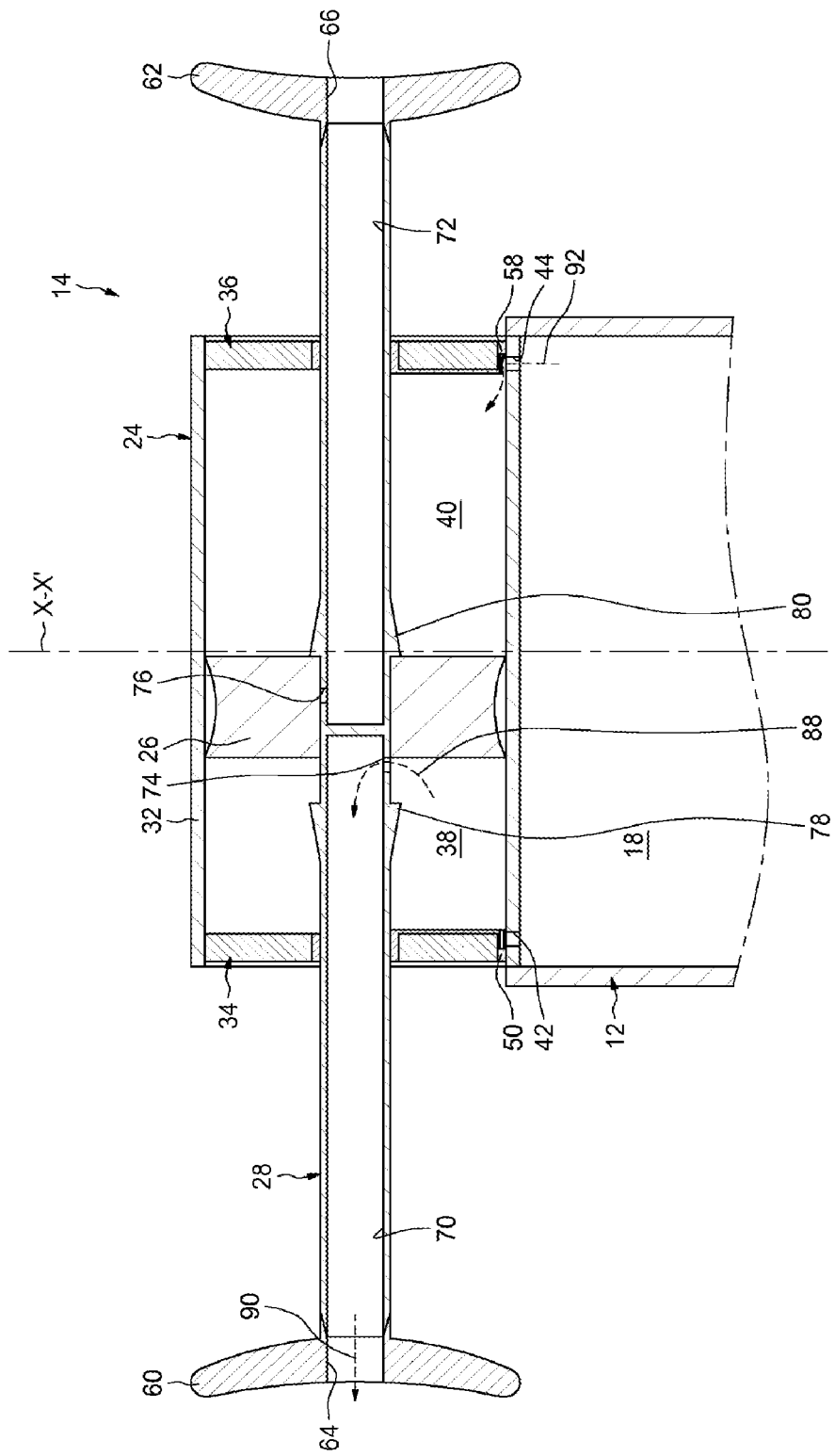

DEVICE FOR PACKAGING AND DISPENSING A PRODUCT, NOTABLY A COSMETIC PRODUCT

CROSS-REFERENCE TO RELATED APPLICATIONS

This application is the National Phase of International Patent Application No. PCT/EP2017/066595, filed Jul. 4, 2017, published on Jan. 11, 2018 as WO 2018/007366 A1, which claims priority to French Application No. 1656461, filed Jul. 6, 2016. The contents of these applications are herein incorporated by reference in their entirety.

The present invention relates to a device for packaging and dispensing a product.

The device is particularly suited to dispensing cosmetic, pharmaceutical and dermatological pharmaceutical products. Such products may for example be dispensed in the form of a milk, a cream, a gel, a foam, etc.

Products of the abovementioned type are commonly stored in a container made notably of thermoplastic material or of glass. The storage container is equipped with a dispensing head fastened to the neck of the container and comprising a movable pushbutton, so as to be able to deliver a dose of product.

Storage containers of the type using a variable-volume compartment and equipped with a pump without air intake, generally called an airless pump, are widely used in the field of cosmetics. Such containers are advantageous in that the product to be dispensed is packaged and stored in a manner isolated from air.

The pushbutton provided on such storage containers has an outlet orifice in communication with the pump so as to deliver a dose of product in response to actuation of this pump. This actuation is performed by exerting pressure on the pushbutton. For more detail with regard to the design of such storage containers, reference may be made for example to patent application EP-A1-2 353 727 (Rieke Corporation).

In order for a user to be able to actuate the pump and collect the product that is dispensed using the same hand, it is known to design the pushbutton in the form of a cup that is for example concave.

However, such a design does not make it possible to guarantee precise dosing of product upon each use. Specifically, the amount of product that is dispensed depends mainly on the area of the pushbutton on which the user exerts pressure. Furthermore, if the user partly covers the outlet orifice when he exerts this pressure, there may be an uncontrolled projection of the dispensed product.

The present invention aims to overcome these drawbacks.

More particularly, the present invention aims to provide a packaging and dispensing device that makes it possible to precisely control the amount of product that is dispensed upon each use.

The present invention also aims to provide a device having improved user comfort.

One subject of the invention is a device for packaging and dispensing a product, notably a cosmetic product, comprising a container provided with at least one variable-volume compartment containing said product, and a dispensing head comprising a mounting base fastened to the container.

The dispensing head furthermore comprises an internal piston able to move in translation along an axis of movement and delimiting, inside said base, first and second pumping chambers, at least first and second inlet orifices for putting the first and second pumping chambers, respectively, into communication with the compartment of the container, and at least first and second intake valves shutting off the first and second inlet orifices, respectively, in a sealtight manner.

The dispensing head also comprises at least one actuating rod extending through the pumping chambers and the piston and extending so as to project on either side of the mounting base. Said rod internally delimits a first intake channel in communication with a first outlet orifice of the dispensing head, and a second intake channel, separate from said first channel and in communication with a second outlet orifice of said head. At least first and second through-orifices are formed on the actuating rod and open out into said first and second intake channels, respectively.

According to one general feature, the actuating rod is able to move axially and provided with stop means able to permit said rod to slide in relation to said piston between a first extreme position and a second extreme position.

In the first extreme position, the first through-orifice is blocked by the piston, and the second through-orifice puts the second intake channel into communication. In the second extreme position, said first orifice puts the first intake channel into communication with the first pumping chamber, and said second orifice is blocked by the piston.

"The actuating rod is able to move axially" is understood to mean a movement of this rod in an axial direction with respect to the axis of movement of the piston. The actuating rod may for example move along an axis coincident with this axis of movement. As a variant, the axis of movement of the rod may be parallel to the axis of movement of the piston. The axis of movement of the piston forms a nonzero angle with a longitudinal axis of the storage container. Preferably, the axis of movement of the piston is orthogonal to said longitudinal axis.

"A second intake channel separate from said first channel" should be understood to mean that the second intake channel is not in fluidic communication inside the rod with the first intake channel.

The product is able to be dispensed by manually moving the rod in a first direction of actuation or in an opposing second direction of actuation. The rod, the piston and the mounting base form a dual direction of actuation airless pump.

Given that the rod and the piston are able to be actuated in two opposing directions, it is not necessary to provide position return means, for example in order to achieve an automatic return of the actuating means and aspiration of the product contained in the storage container, as is the case in conventional dispensing devices.

Furthermore, the amount of product that is dispensed is easily able to be controlled and modified upon each use, depending on the travel of the actuating rod. Moreover, the particular design of the device prevents use of the same hand to control the dispensing of the product and collect it.

The intake valves are preferably borne by the mounting base. Each intake valve and the associated inlet orifice form a one-way valve that allows for the intake of product, initially contained in the compartment of the storage container, into the pumping chamber in communication with said orifice.

When there is a prevailing overpressure in this chamber, the intake valve continues to bear in a sealtight manner on a seat of the mounting base, whereas a depression in said chamber causes the intake valve to move away from its seat, allowing for aspiration of the product.

In one advantageous embodiment, each intake valve is made at least partly from elastically deformable material. Such a design makes it possible to avoid the use of balls. To provide the intake valves with greater flexibility, these may be provided with one or more recesses, for example produced in the form of slots or orifices, and/or locally have a reduced thickness.

The mounting base may comprise opposing first and second closing flanges delimiting the first and second pumping chambers. In one particular embodiment, the intake valves are borne by the first and second closing flanges, respectively.

Advantageously, each closing flange may also comprise an annular sealing ring interacting with the actuating rod in a sealtight manner. The sealing ring of each closing flange is preferably integral with the intake valve of said flange. As an alternative, however, it is possible to provide an intake valve positioned on the flange without being connected to other means that are added to this flange.

Advantageously, the dispensing head may furthermore comprise first and second pushbuttons joined to the actuating rod. In one particular embodiment, these pushbuttons are equipped with first and second outlet orifices, respectively, for the product.

Each pushbutton thus allows the user either to control dispensing of product through the other pushbutton, or to receive the product that is dispensed. To promote ergonomics and the collection of the product, each pushbutton may have the shape of a concave cup. As a variant, however, it is possible to provide other shapes for the pushbuttons.

Advantageously, the device according to the invention may be used to package and dispense a cosmetic or dermatological product, notably in the form of a cream, a foam, a gel or a milk.

Figure 2:
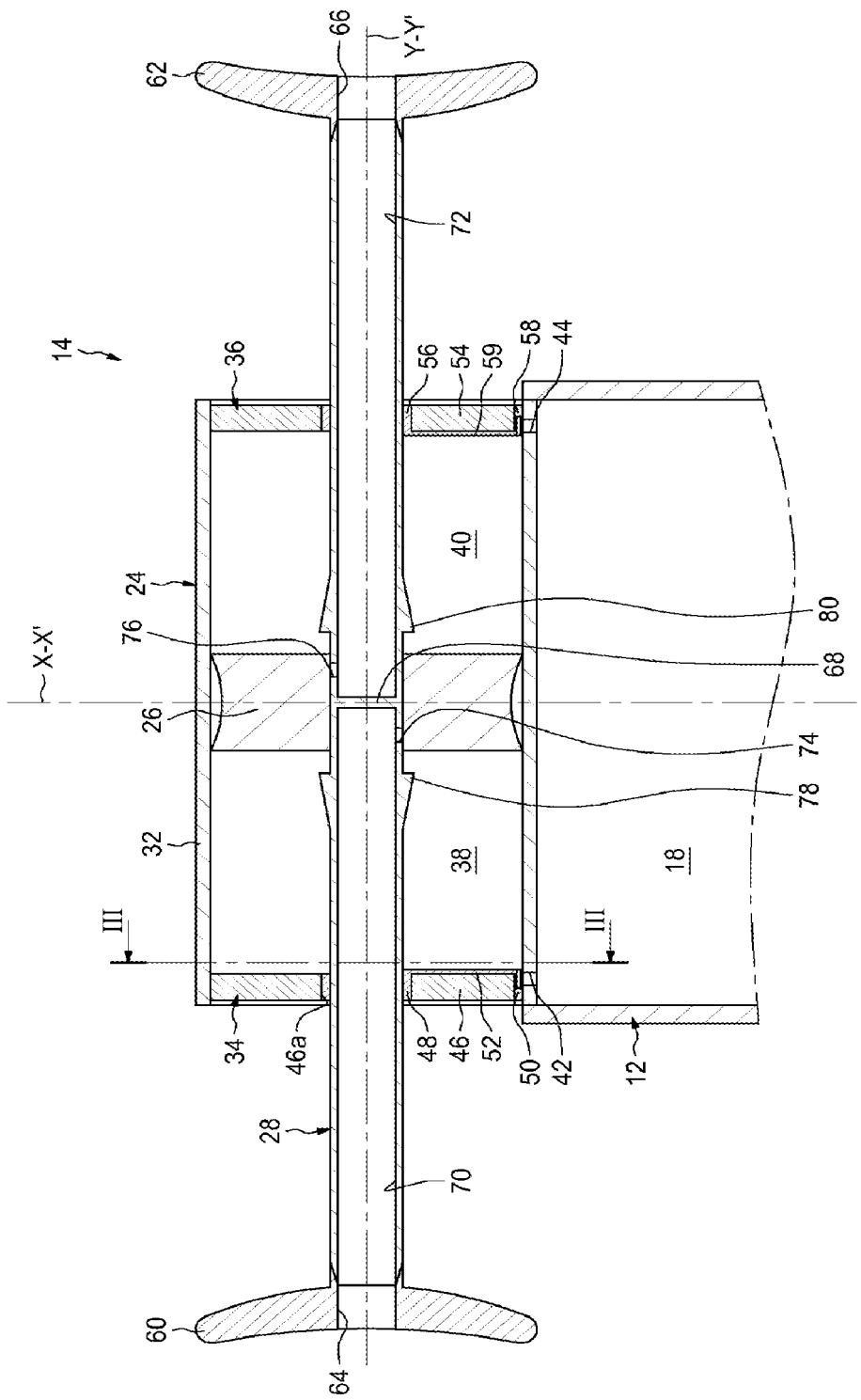
Figure 3:
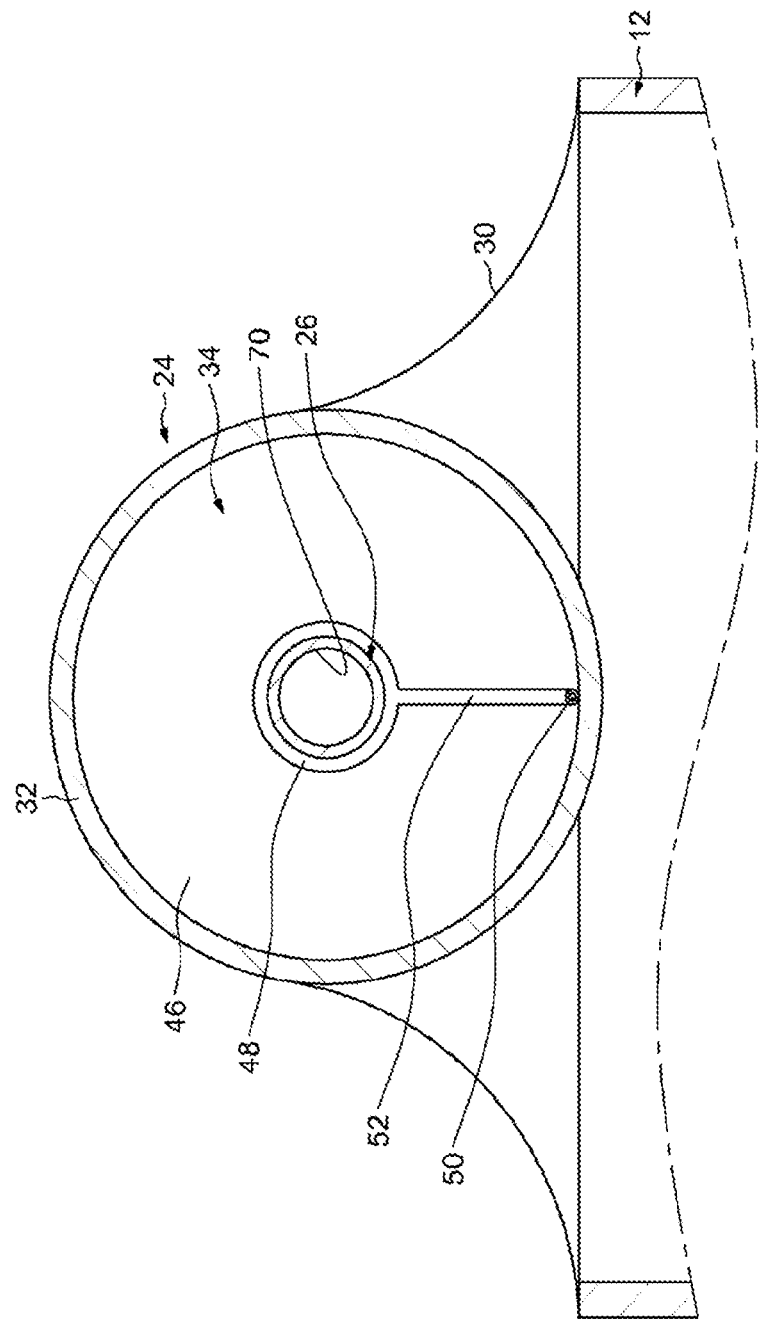

The present invention will be better understood upon studying the detailed description of one embodiment, taken by way of wholly nonlimiting example and illustrated by the appended drawings, in which:

FIG. 1 is a sectional view of a packaging and dispensing device according to one exemplary embodiment of the invention, FIG. 2 is a partial view of FIG. 1, FIG. 3 is a sectional view along the axis III-III of FIG. 2, and FIGS. 4 to 7 are partial sectional views of the device of FIG. 1 in various use positions.

FIG. 1 illustrates a device, denoted by the general reference number 10, which comprises a container 12 for storing a product (not shown) and a head 14 for dispensing said product and mounted on the container. The device 10 is shown in a position that is assumed to be vertical.

The container 12 extends along a longitudinal, in this case vertical, axis X-X'. The container 12 comprises a lower end forming a bottom and an opposing open end to which the dispensing head 14 is fastened using any suitable means, for example by screwing or by snap-fitting.

The container 12 comprises a piston 16 that is mounted inside said container in a sealtight manner while being able to move freely in the axial direction. Inside the container 12, the piston 16 delimits a variable-volume compartment 18 that contains the product.

In the exemplary embodiment illustrated, inside the container 12, the piston 16 also delimits an additional compartment 20, also a variable-volume compartment, which is at atmospheric pressure by virtue of an air inlet orifice 22 formed here on the bottom of the container. As an alternative, it could be possible to provide a container 12 whose bottom is formed by the piston 16 and that would thus not have an air intake orifice. As the product contained in the compartment 18 is dispensed, the piston 16 rises inside the container 12 under the effect of the depression resulting from the reduction in volume of the product. The container 12 and the piston 16 are each produced as one piece, for example by molding a thermoplastic material, for example made of polypropylene (PP) or made of polyethylene (PE).

As illustrated more clearly in FIG. 2, the dispensing head 14, coaxial to the axis X-X', comprises a mounting base 24 on the container 12, an internal piston 26 mounted inside said base, and an actuating rod 28 mounted so as to be able to move with respect to the base and to the piston and making it possible to dispense product, as will be described in further detail hereinafter.

The base 24 performs a dual function, namely that of ensuring mounting of the dispensing head 14 on the container 12 and of supporting the piston 26 and the rod 28. The mounting base 24 comprises a body 30 (FIG. 3) for mounting on the container 12, and a dispensing tube 32 inside which the piston 26 is mounted. The mounting base 24 also comprises two closing flanges 34, 36 each positioned at one of the ends of the tube 32. Each flange is fastened to the tube 32 using any suitable means, for example by adhesive bonding.

The cross section of the piston 26 corresponds precisely to the internal cross section of the tube 32. In the exemplary embodiment illustrated, the cross section of the piston 26 is circular. As a variant, other shapes could be provided. The body 30 and the tube 32 are produced as a single piece, for example by molding a thermoplastic material, notably made of PP or made of polybutylene terephthalate (PBT). The piston 26 may also be produced by molding a thermoplastic material, for example made of PE.

The piston 26 is mounted freely inside the mounting base 24 in a sealtight manner. The piston 26 is mounted so as to be able to move inside the base 24 along an axis Y-Y', which is in this case orthogonal to the axis X-X' of the container 12. The axis Y-Y' is in this case horizontal. Inside the mounting base 24, the piston 26 delimits first and second pumping chambers 38, 40. More precisely, the first pumping chamber 38 is delimited by the tube 32, the closing flange 34 and the piston 26, whereas the second pumping chamber 40 is delimited by the tube, the piston and the closing flange 36.

The dispensing head 14 comprises a first inlet orifice 42 for putting the first pumping chamber 38 and the compartment 18 of the container into fluidic communication, and a second inlet orifice 44 for putting this compartment and the second pumping chamber 40 into fluidic communication. The orifice 42, respectively 44, opens out into the first pumping chamber 38, respectively 40, and into the compartment 18. The inlet orifices 42, 44 are formed in this case in the thickness of the mounting base 24, more precisely in the thickness of the tube 32. The inlet orifices 42, 44 are positioned on either side of the piston 26.

In the exemplary embodiment illustrated, each closing flange 34, 36 performs a triple function, namely that of shutting off the tube 32, of supporting the actuating rod 28 in a sealtight manner and of shutting off the associated inlet orifice 42, 44. As the closing flanges 34, 36 are identical in this case, only one of them will be described in detail with reference to FIGS. 2 and 3.

The flange 34 comprises a main body 44 whose shape matches the bore of the tube 32 of the mounting base and that is provided with a bore 46a for the passage of the rod 28. The flange 34 also comprises a sealing ring 48 covering said bore and bearing against the rod 28 so as to ensure that same is mounted in a sealtight manner, an intake valve 50 shutting off the inlet orifice 42 and a joining portion 52 linking the valve to the ring. The valve 50 and the orifice 42 form a one-way valve allowing for the intake of the product contained in the compartment 18 of the storage container into the pumping chamber 38. In the exemplary embodiment illustrated, the intake valve 50 takes the form of a cylindrical cone. The valve 50 is in this case partly hollow, so as to give it greater flexibility. The joining portion 52 takes the form of a strip having a small thickness.

The ring 48, the valve 50 and the joining portion 52 of the flange are produced as a single piece from an elastically deformable material, for example made of elastomer or made of thermoplastic elastomer (TPE). The body 44 is made of a rigid material, for example made of thermoplastic, notably made of PP. The closing flange 34 may be obtained for example by bi-injection. In the same way, the closing flange 36 comprises a main body 54, a sealing ring 56, an intake valve 58 and a joining portion 59.

The dispensing head 14 also comprises first and second pushbuttons 60, 62 each mounted at one end of the actuating rod 28, in this case by press-fitting. In the exemplary embodiment illustrated, each pushbutton 60, 62 takes the form of a cup of concave shape. An outlet orifice 64, 66 is formed on each pushbutton 60, 62. The orifices 64, 66 form the outlet orifices of the dispensing head 14. Each orifice 64, 66 is in this case coaxial to the axis Y-Y'. The pushbuttons 60, 62 may advantageously be produced by molding a thermoplastic material, for example made of PP.

The actuating rod 28 is mounted so as to be able to move in translation with respect to the mounting base 24 and to the piston 26 along the axis Y-Y' of movement of said piston. The axis of movement of the rod is in this case coincident with the axis Y-Y'. The rod 28 extends through the pumping chambers 38, 40, the piston 26 and the flanges 34, 36. The rod 28 extends so as to project on either side of the mounting base 24. The rod 28 is rectilinear. Each pushbutton 60, 62 is mounted on one of the protruding end parts of the rod 28. In the exemplary embodiment illustrated, the actuating rod 28 is also able to move in rotation about the axis Y-Y'. As an alternative, this possibility of rotating the rod 28 could be removed.

The actuating rod 28, which is hollow, is provided on the inside with a separating wall 68 that delimits, on either side, first and second intake channels 70, 72. There is no direct fluidic communication between the channels 70, 72. Each channel 70, 72 extends from the wall 68 as far as one of the free ends of the rod 28. In the exemplary embodiment illustrated, the wall 68 is situated substantially in the middle of the rod 28. As a variant, it is possible to provide another position for this wall. The first intake channel 70 is in fluidic communication with the outlet orifice 64 of the first pushbutton 60, whereas the second channel 72 is in communication with the outlet orifice 66 of the second pushbutton 60.

The actuating rod 28 also comprises first and second through-orifices 74, 76 formed starting from the outer surface of said rod and opening out into the first and second intake channels 70, 72, respectively. The orifices 74, 76 are therefore positioned on either side of the wall 68. The spacing between the orifices 74, 76 is smaller than the thickness of the piston 26, so as to be able to be blocked simultaneously by said piston, as illustrated in the position of FIG. 2.

First and second protuberances 78, 80 are also provided on the outer surface of the rod 28 and extend so as to project toward the outside with respect to said surface. The protuberances 78, 80 are joined to the rod 28. The protuberances 78, 80 are positioned on either side of the piston 26. The protuberance 78, respectively 80, is situated in the pumping chamber 38, respectively 40, of the mounting base.

In the exemplary embodiment illustrated, each protuberance 78, 80 is annular and has a triangular cross section. As a variant, these protuberances may have a cross section having a different profile, for example square, rectangular, circular, etc. As an alternative or in combination, it is also possible to provide protuberances that are non-continuous in the circumferential direction.

The protuberances 78, 80 form stop means that are able to limit the movement of the actuating rod 28 in relation to the piston 26. The rod 28 is able to move with respect to the piston 26 between a first extreme position, in which the protuberance 78 bears against a first face of the piston 26, and a second extreme position, in which the protuberance 80 bears against an opposing second face of said piston 26. The relative movement of the rod 28 and of the piston 26 is permitted only between the first and second extreme positions.

The rod 28 is advantageously produced as a single piece by molding a thermoplastic material, for example made of PP or made of polyoxymethylene (POM). As a variant, it is possible to provide protuberances 78, 80 that are added to the rod.

To dispense the product contained in the compartment 18 of the container, the user acts as follows.

Figure 4:
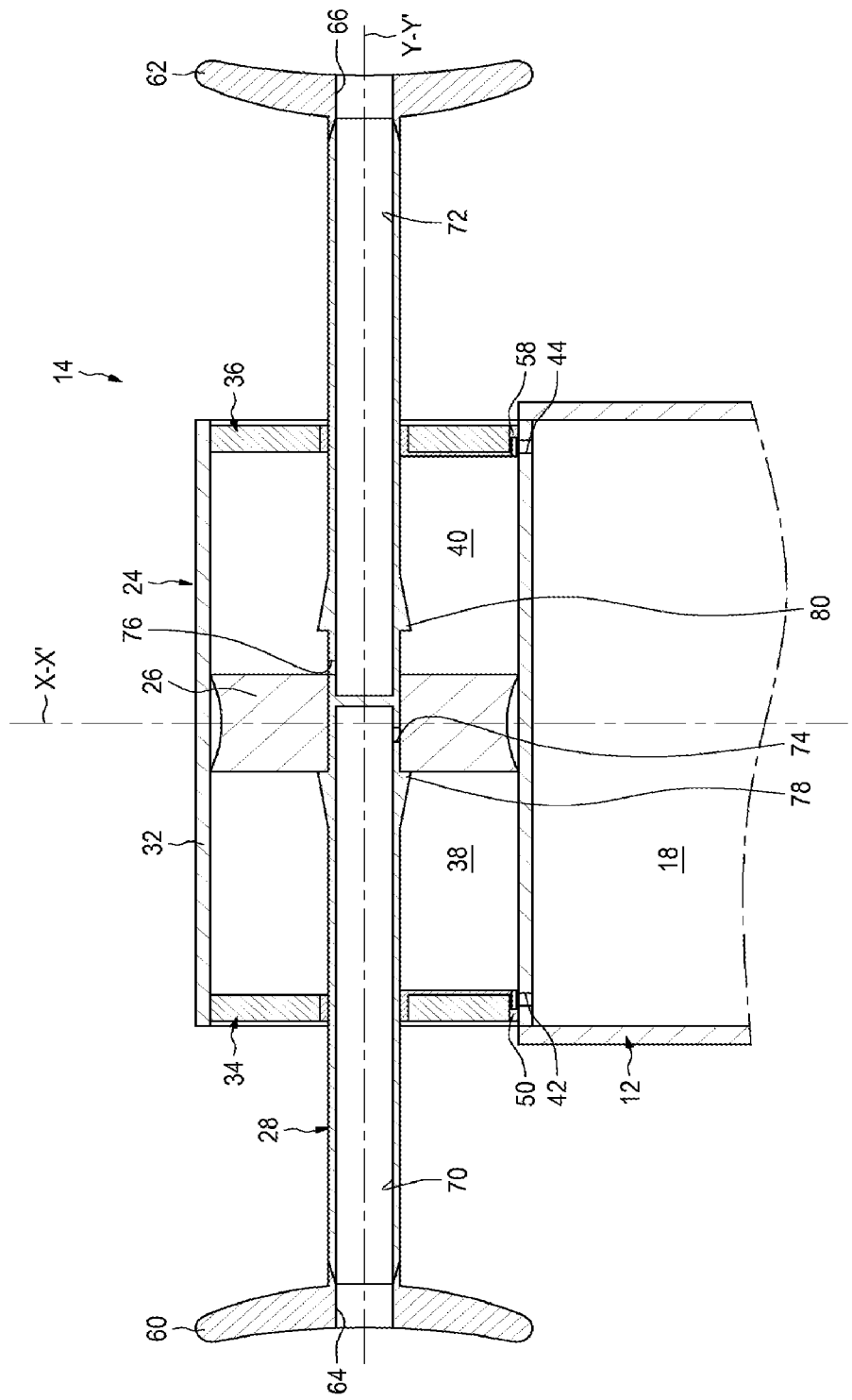

Starting from the position illustrated in FIG. 2, if the user presses the pushbutton 60, the actuating rod 28 slides axially, with respect to the axis Y-Y', in relation to the piston 26, until the protuberance 78 bears against said piston, as illustrated in FIG. 4. In this position, only the first through-orifice 74 is blocked by the piston 26, the second through-orifice 76 being left free by said piston and being in communication with the second pumping chamber 40. The orifice 76 is left completely free by the piston 26 in this position. This promotes the achievement of a stable flow rate. As a variant, the piston 26 could also partly cover the orifice 76.

Figure 5:
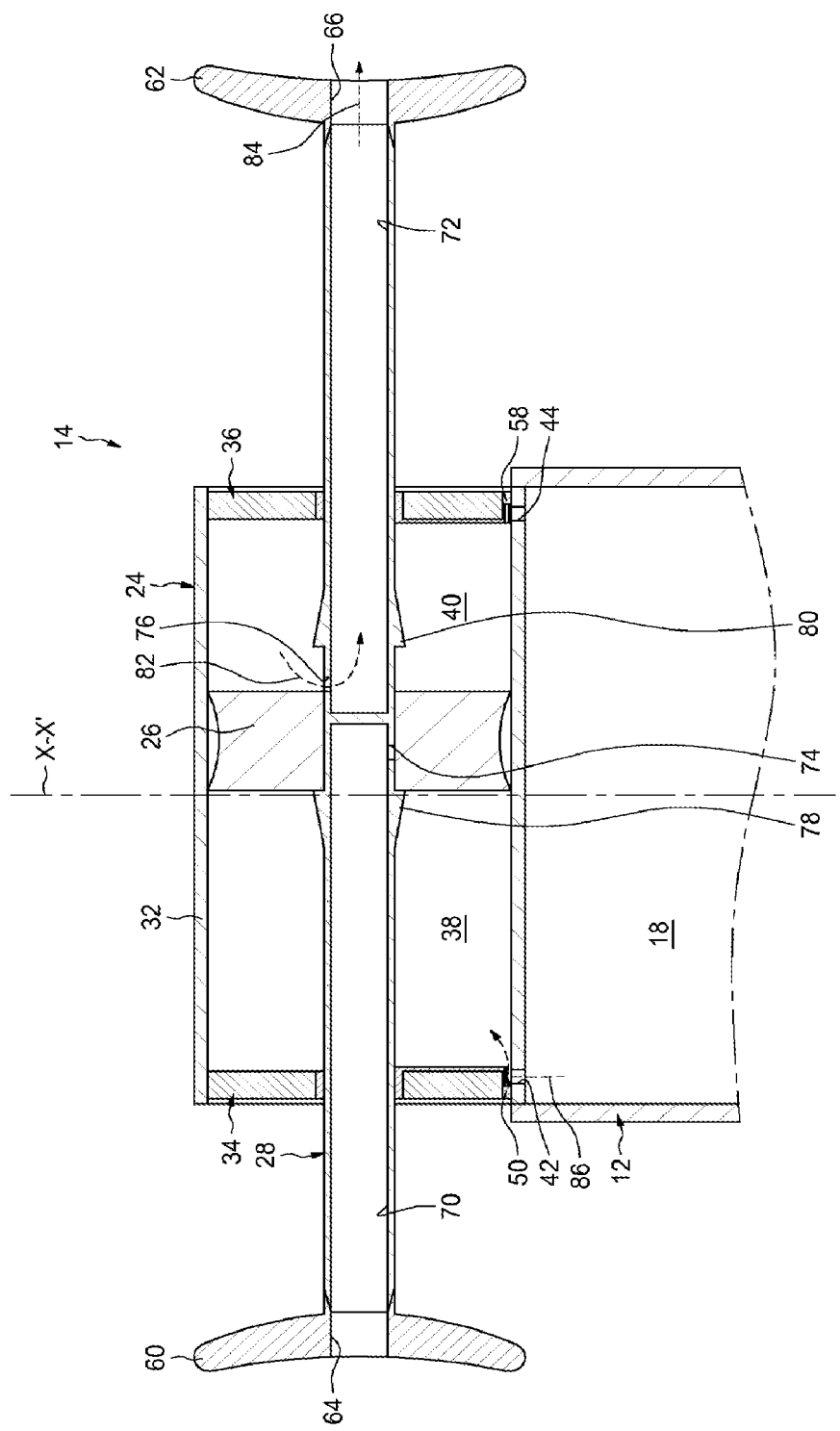

Next, under the effect of the pressure exerted on the pushbutton 60 by the user, the piston 26 and the rod 28 jointly slide axially in the direction of the flange 36, thereby causing a reduction in the volume of the second pumping chamber 40, as is visible in FIG. 5.

Part of the product present in this pumping chamber 40 is forced through the second orifice 76, as illustrated schematically by the arrow referenced 82. This causes movement of the product contained in the second intake channel 72, and exiting of said product through the orifice 66 of the pushbutton 62, which is illustrated schematically by the arrow referenced 84. The overpressure, which is created by moving the piston 26 and which prevails inside the pumping chamber 40, keeps the intake valve 58 in the closed position, i.e. in the position closing off the inlet orifice 44.

At the same time as the reduction in the volume of the second pumping chamber 40 caused by the movement of the piston 26, there is an increase in the volume of the first pumping chamber 38. This causes a depression to be created inside this pumping chamber 38, which depression is enough to achieve opening of the intake valve 50 and aspiration of the product contained in the compartment 18 of the container through the inlet orifice 42, which is illustrated schematically by the arrow referenced 86. This causes the follower piston to rise inside the storage container.

Starting from the position illustrated in FIG. 2, if the user presses the pushbutton 62 and not the pushbutton 60, the operation of the dispensing head is reversed. The rod 28 slides with respect to the piston 26 until the protuberance 80 bears against said piston, as illustrated in FIG. 6.

In this position, only the second through-orifice 76 is blocked by the piston 26, the first through-orifice 74 being left free by said piston and being in communication with the first pumping chamber 38. Next, under the effect of the pressure exerted on the pushbutton 62 by the user, the piston 26 and the rod 28 jointly slide in the direction of the flange 34, thereby causing a reduction in the volume of the first pumping chamber 38 and in increase in the volume of the second pumping chamber 40, as is visible in FIG. 8.

Part of the product present in the pumping chamber 38 is forced through the first orifice 74, as illustrated schematically by the arrow referenced 88. This causes movement of the product contained in the first intake channel 70, and exiting of said product through the orifice 64 of the pushbutton 60, which is illustrated schematically by the arrow referenced 90.

At the same time, as the volume of the second pumping chamber 40 increases, a depression is created inside this chamber, thereby leading to opening of the intake valve 58 and aspiration of the product contained in the compartment 18 of the container to this pumping chamber 40 through the inlet orifice 44, which is illustrated schematically by the arrow referenced 92. This causes the follower piston to rise inside the storage container. By contrast, the overpressure prevailing inside the pumping chamber 38 keeps the intake valve 50 in the closed position.

When the device has not yet been used and the pumping chambers 38, 40 and the intake channels 70, 72 of the actuating rod are empty, a few successive presses on the pushbuttons 60, 62 are enough to fill them. The device may easily be manipulated by the user by picking up the container 12 in one hand, by pressing one of the pushbuttons 60, 62 using the thumb of this hand, and by receiving the product dispensed through the outlet orifice of the other pushbutton with the other hand.

By virtue of the invention, a device is obtained that has a novel usage technique in that the product is able to be dispensed by moving the actuating rod 28 in two opposing directions.

Furthermore, the device makes it possible to dispense with the use of a return means, such as a spring, as is the case in conventional devices in order to return the actuating means to the initial position and to achieve aspiration of the product contained in the storage container.

With the device of the invention, when part of the product contained in one of the pumping chambers 38, 40 is aspirated through the associated through-orifice of the rod 28 in order to dispense the product, there is simultaneous aspiration of the product contained in the storage container 12 to the other pumping chamber. The movement of the rod 28 and of the piston 26 causes this dual aspiration, so that there is both exiting of the product from one of the pumping chambers 38, 40 and entry of the product into the other chamber.

Moreover, the amount of product that is dispensed upon each use is easily able to be controlled by the user. In order for the user to be able to identify the position of the piston 26 inside the mounting base 24 and control sliding thereof with even greater precision, this base may be made of a transparent or translucent material, allowing the piston to be seen. For this purpose, it is also possible furthermore to provide scales or markers for identifying the position of the piston 26 on the base 24, and thus to ensure that a sufficiently precise and reproducible dose of product exits.

In the exemplary embodiment illustrated in the figures, the container comprises a follower piston that moves over time so as to reduce the volume of the compartment containing the product to be dispensed. As an alternative, it is possible to provide a container comprising a pouch with a flexible wall that delimits the variable-volume compartment.

In the exemplary embodiment illustrated, the outlet orifices of the dispensing head are formed on the pushbuttons. As a variant, it could be possible to provide another position for the outlet orifices. For example, the rod may be closed at each end and these orifices may be formed in the thickness of said rod so as to dispense product in a direction orthogonal to the axis of movement of the rod.

The invention claimed is:

1. A device for packaging and dispensing a product, the device comprising:
    a container that comprises at least one variable-volume compartment containing the product; and
    a dispensing head comprising:
        a mounting base fastened to the container,
        an internal piston configured to move in translation along an axis of movement and delimiting, inside the mounting base, first and second pumping chambers,
        at least first and second inlet orifices for putting the first and second pumping chambers, respectively, into communication with the compartment of the container,
        at least first and second intake valves configured to close the first and second inlet orifices, respectively, in a sealed manner,
        at least one actuating rod extending through the pumping chambers and the internal piston and extending so as to project on either side of the mounting base, the at least one actuating rod internally delimiting a first intake channel in communication with a first outlet orifice of the dispensing head, and a second intake channel, separate from the first intake channel and in communication with a second outlet orifice of the dispensing head, and
        at least first and second through-orifices formed on the actuating rod and opening out into the first and second intake channels, respectively,
        wherein the actuating rod is configured to move axially and comprising a stopper configured to permit the actuating rod to slide relative to the internal piston between (i) a first extreme position in which the first through-orifice is blocked by the internal piston and the second through-orifice puts the second intake channel into communication with the second pumping chamber, and (ii) a second extreme position in which the first orifice puts the first intake channel into communication with the first pumping chamber and the second orifice is blocked by the internal piston.

2. The device as claimed in claim 1, wherein the axis of movement of the internal piston is orthogonal to a longitudinal axis of the storage container.

3. The device as claimed in claim 1, wherein the dispensing head comprises first and second push-buttons joined to the actuating rod and comprising the first and second outlet orifices, respectively.

4. The device as claimed in claim 3, wherein each push-button has a concave shape.

5. The device as claimed in claim 1, wherein each intake valve is configured to close the associated inlet orifice in a sealed manner in the absence of a depression inside the pumping chamber associated with the inlet orifice.

6. The device as claimed in claim 1, wherein each intake valve comprises an elastically deformable material.

7. The device as claimed in claim 1, wherein the intake valves are supported by the mounting base.

8. The device as claimed in claim 1, wherein the mounting base comprises opposing first and second closing flanges delimiting the first and second pumping chambers.

9. The device as claimed in claim 8, wherein the first and second intake valves are supported by the first and second closing flanges, respectively.

10. The device as claimed in claim 8, wherein each closing flange comprises an annular sealing ring configured to engage with the actuating rod in a sealed manner.

11. The device as claimed in claim 10, wherein the sealing ring of each closing flange is integral with the intake valve of the respective closing flange.

12. The device as claimed in claim 1, wherein the mounting base is made of a transparent or translucent material, allowing the internal piston to be seen.

13. The device as claimed in claim 12, wherein the mounting base furthermore comprises scales or markers for identifying a position of the internal piston inside the base.

14. The device as claimed in claim 1, wherein the container comprises a follower piston configured to move inside the container and delimiting the compartment in a sealed manner.

15. The device as claimed in claim 1, where the container comprises at least one inlet orifice configured to permit an intake of air into the container and out of the compartment as the product is pumped into the compartment.

16. The device as claimed in claim 1, wherein the product is a cosmetic product.

\* \* \* \* \*